G. G. GRIFFIN.
VEHICLE WHEEL.
APPLICATION FILED NOV. 13, 1913. RENEWED APR. 30, 1917.
1,244,193. Patented Oct. 23, 1917.
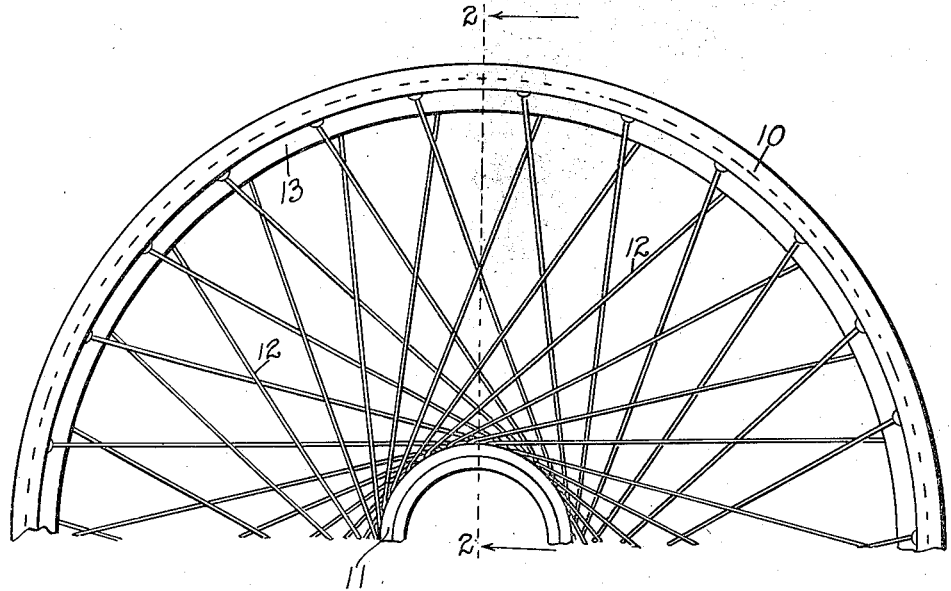
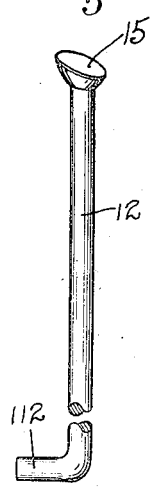
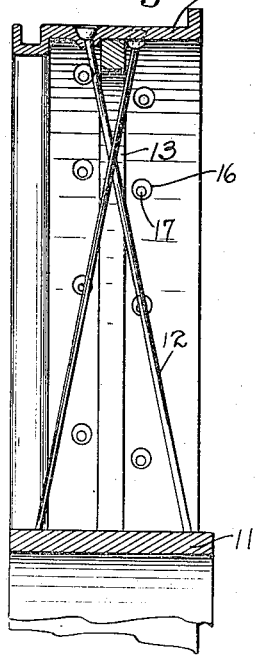
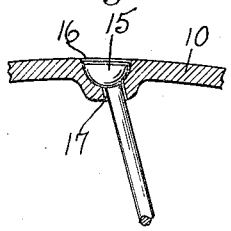
WITNESSES:
R. J. Lockwood
O. M. McLaughlin
INVENTOR.
GEORGE G. GRIFFIN.
BY V. H. Lockwood
ATTORNEY.

UNITED STATES PATENT OFFICE.

GEORGE G. GRIFFIN, OF INDIANAPOLIS, INDIANA.

VEHICLE-WHEEL.

1,244,193.　　　　Specification of Letters Patent.　　Patented Oct. 23, 1917.

Application filed November 13, 1913, Serial No. 800,811. Renewed April 30, 1917. Serial No. 165,618.

*To all whom it may concern:*

Be it known that I, GEORGE G. GRIFFIN, a citizen of the United States, and a resident of Indianapolis, county of Marion, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to improve the construction of wire spoke vehicle wheels so that the surface of the rim will be smooth and not cut or injure the tire, and the rim will be strong and durable although of relatively light weight.

A feature of the invention consists in combining a rather thin rim and two rows of inwardly extending wire spokes spaced apart from each other at the rim and crossing each other near the rim and having reinforcing means on the inner surface of the rim between the two series of wire spokes, whereby such reinforcement is confined to the point of stress and the stress or pull of the spokes is located on each side and close to said reinforcement and the direction of pull of the spokes is inclined toward the reinforcement.

The nature of the invention will be understood from the accompanying drawings and the following description and claims:

In the drawings, Figure 1 is a side elevation of the upper half of such wire spoked wheel. Fig. 2 is a section on the line 2—2 of Fig. 1, with a portion of the rim and spokes removed. Fig. 3 is a section through a portion of the rim showing the spoke mounting on a large scale. Fig. 4 is a perspective view of one of the wire spokes broken away between its ends.

There is shown herein the rim 10, hub 11 and the spokes 12 of a wire spoked wheel. The spoke has an inturned end 112 which is insertible radially into the side of the hub and the spoke extends tangentially from the hub to the rim and, therefore, the spoke is non-radial. There are two series of such spokes, one secured to each lateral portion of the hub, as shown in the lower part of Fig. 2, and, therefore, on each side of the radial plane through the wheel. These spokes are arranged in transverse pairs and the spokes of the two series cross each other near the rim and at the outer ends extend through the rim and are headed to prevent withdrawal from the rim.

One advantage of a vehicle wheel of this type is its lightness in proportion to its strength and for accomplishing that purpose more effectively, this invention contemplates a relatively thin light rim 10 with an annular reinforcing bar 13 secured to the inner surface of the rim between the two series of wire spokes, as shown in Figs. 1 and 2. The outer ends of the two series of wire spokes are secured to the rim at points not very far apart so that the outer ends of the spokes at their attachment with the rim are adjacent to the opposite sides of the reinforcing bar 13, preferably as close as possible and since the spokes incline so as to cross each other in a non-radial way, as shown in Fig. 2, the spokes almost touch the inner edges of the reinforcing bar 13. Therefore, preferably the spokes are located as close to the bar as possible for the purpose of limiting the width of the reinforcing bar 13 and getting from the construction the greatest possible resistance and strength of the rim and reinforcing bar with the least possible weight and this is attained by having the reinforcing bar between the spokes and having the spokes and their attachment to the rim as close to the reinforcing bar as possible.

For the purpose of attaching or securing the spokes to the rim so that the connection will be strong and yet the structure furnish a smooth external rim surface so as not to injure the tire, the spokes have an enlarged head 15 on their outer ends and which may be said to be substantially radially disposed on non-radial spokes. The rim is provided with substantially radial depressions 16 with non-radial holes 17 therethrough for the spokes. The head 15 fits in and fills the recess 16 so that the surface of the rim and spoke heads will be flush and smooth. Therefore, the outer surfaces of the spoke heads 15 are substantially at a right angle to the radial line of the wheel. Likewise the body of the head and the recess 16 or the spoke hole are at an inclination, as shown in Fig. 3. Since the spoke is arranged tangentially of the hub and crosses the other series of spokes, the head of the spoke bears a peculiar relationship to the extension 112 on the inner end of the spoke, as indicated in Fig. 4.

The invention is:

1. The combination with a hub and rim of a vehicle wheel, of a plurality of series of spokes connected with said rim and spaced from each other, and an annular reinforcing means provided on the inner surface of the rim between the series of spokes substantially as and for the purpose set forth.

2. The combination with the rim and hub of a vehicle wheel, of two series of spokes, the spokes of the two series crossing each other, and reinforcing means provided on the inner surface of the rim between the two series of spokes.

3. The combination with the rim and hub of a vehicle wheel, of two series of spokes, each series of spokes extending from the hub on one side of a radial plane through the wheel to the rim at the other side of such plane so that the two series of spokes will cross each other, and a reinforcing bar secured to the inner surface of the rim between the two series of spokes.

4. The combination with the hub and rim of a vehicle wheel, reinforcing means provided on the inner surface of the rim, and two series of spokes connecting the hub and rim, the spokes of the two series crossing each other and being held in the rim adjacent the opposite sides of said reinforcing means.

In witness whereof, I have hereunto affixed my signature in the presence of the witnesses herein named.

GEORGE G. GRIFFIN.

Witnesses:
ORPHA M. McLAUGHLIN,
R. G. LOCKWOOD.